(12) United States Patent
Kost

(10) Patent No.: US 9,669,594 B2
(45) Date of Patent: Jun. 6, 2017

(54) TIRE BUFFING APPARATUS WITH BELT DETECTION SYSTEM

(71) Applicant: Bridgestone Bandag, LLC, Muscatine, IA (US)

(72) Inventor: Troy A. Kost, LeClaire, IA (US)

(73) Assignee: Bridgestone Bandag, LLC, Muscatine, IA (US)

( * ) Notice: Subject to any disclaimer, the term of this patent is extended or adjusted under 35 U.S.C. 154(b) by 0 days.

(21) Appl. No.: 15/107,554

(22) PCT Filed: Dec. 12, 2014

(86) PCT No.: PCT/US2014/069895
§ 371 (c)(1),
(2) Date: Jun. 23, 2016

(87) PCT Pub. No.: WO2015/100030
PCT Pub. Date: Jul. 2, 2015

(65) Prior Publication Data
US 2016/0318270 A1    Nov. 3, 2016

Related U.S. Application Data

(60) Provisional application No. 61/920,267, filed on Dec. 23, 2013.

(51) Int. Cl.
*B29D 30/54*    (2006.01)
*G01V 3/10*    (2006.01)

(52) U.S. Cl.
CPC .............. *B29D 30/54* (2013.01); *G01V 3/10* (2013.01); *B29D 2030/541* (2013.01); *B29D 2030/546* (2013.01)

(58) Field of Classification Search
CPC ........ B29D 30/54; B29D 30/68; B29D 30/52; B29D 2030/541; B29D 2030/546;
(Continued)

(56) References Cited

U.S. PATENT DOCUMENTS 6,386,024 B1    5/2002    Marck et al.
7,040,371 B2    5/2006    Mory et al.
(Continued)

FOREIGN PATENT DOCUMENTS

| CN | 202475818 U | 10/2012 |
| JP | 102741042 A | 10/2012 |
| KR | 1020050095092 | 4/2006 |

OTHER PUBLICATIONS

The international preliminary report on patentability issued in PCT Application No. PCT/US2014/069895, dated Jun. 28, 2016.
(Continued)

*Primary Examiner* — David B Thomas

(57) ABSTRACT

A tire buffing apparatus for a tire casing having a plurality of steel belts arranged therein is provided. The tire buffing apparatus including a hub assembly for supporting and rotating a tire casing and a rasp assembly including a rotatable rasp for buffing a tire casing. A tire belt detection system is provided that includes an induction coil element and a sensor. The induction coil element is configured and arranged in relation to the hub assembly such that when the induction coil element is connected to an AC power source, the induction coil element induces a current in the steel belts of a tire casing supported on the hub assembly. The sensor is configured to produce a signal when the rotating rasp is subject to a voltage. A control unit is configured to direct the rasp assembly to stop buffing a tire casing when the sensor produces the signal.

20 Claims, 3 Drawing Sheets

(58) Field of Classification Search
CPC .......... G01V 3/10; B24B 29/00; B24B 49/04;
B21C 47/00
See application file for complete search history.

(56) References Cited

U.S. PATENT DOCUMENTS

2010/0130099 A1   5/2010   Manuel et al.
2011/0214801 A1   9/2011   Lindsay et al.

OTHER PUBLICATIONS

The International Search Report and Written Opinion of the International Authority issued in PCT Application No. PCT/US2014/069895, dated Mar. 31, 2015.
English abstract of CN102741042A, Oct. 17, 2012, Bridgestone Corp. (JP).
English abstract of CN202475818U, Oct. 3, 2012, Jiangsu Ship Tec Automation Technology Co Ltd.

TIRE BUFFING APPARATUS WITH BELT DETECTION SYSTEM

BACKGROUND OF THE INVENTION

Retreaded tires provide an economical way to gain additional use from tire casings after the original tread or retread has become worn. According to a conventional method of retreading, sometimes referred to as cold process retreading, worn tire tread on a used tire is removed to create a buffed, generally smooth treadless surface about the circumference of the tire casing to which a new layer of tread may be bonded.

The tire casing is then typically inspected for injuries, some of which may be skived and filled with a repair gum while others may be severe enough to warrant rejection of the casing. After completion of the skiving process, the buffed surface may be sprayed with a tire cement that provides a tacky surface for application of bonding material and new tread. Next, a layer of cushion gum may be applied to the back, i.e., the inside surface of a new layer of tread, or alternatively, the layer of cushion gum may be applied directly to the tacky surface on the tire casing. Conventionally, the cushion gum is a layer of uncured rubber material. The cushion gum and tread may be applied in combination about the circumference of the tire casing to create a retreaded tire assembly for curing. As an alternative, a length of tire tread may be wrapped around the tire casing with the cushion gum already applied. The cushion gum may form the bond between the tread and the tire casing during curing.

Following assembly of the tire casing, cement, cushion gum and tread, the overall retreaded tire assembly may be placed within a flexible rubber envelope. An airtight seal may be created between the envelope and the bead of the tire. The entire envelope tire assembly may be placed within a curing chamber and subjected to a vulcanization process that binds the materials together.

Tire buffers are generally used in tire retreading operations to remove the old, worn tread and to prepare the tire casing for receiving the new, replacement tread. More specifically, the tire buffers are used to remove excess rubber from the tire casing. The buffing of the casing can also be used to provide a substantially even texture on the crown of the casing and to shape the casing into a predetermined profile that is complementary to the new, replacement tread that is to be attached to the tire casing. Tire casings usually include a steel belt package (a package of steel belts or cables) underlying the road-engaging surface (e.g., the original tread) of the tire. During the buffing process, the casing must be buffed, generally to a predetermined characteristic crown radius corresponding to the upper contour of the belt package. In particular, the casing is buffed to leave only a predetermined thickness of material remaining over the top steel belt. In performing the buffing operation, it is important that the buffer not remove too much rubber from the casing and cut into the steel belt package. If any of the steel belts are damaged in any significant respect, the tire casing has to be scrapped.

Typically, tire buffers are automated and are programmed to remove rubber to the desired predetermined depth. To program the tire buffer, pilot skives are done with a hand tool in which the rubber is cut down to the steel belts in three equidistant narrow strips around the tire. This is done to find the approximate depth of the steel belts in that particular tire. This approximate depth is used as a guideline to program the automated tire buffer or as guide for a manual buffer. Unfortunately, this procedure is time-consuming and imprecise and if the tire buffer is set-up wrong it will result in damage to the steel belt package and scrapping of the tire.

The determination of the approximate depth of the steel belts is also occasionally done using an induction sensor that senses the distance between the sensor and the steel belts. However, the accuracy of the induction sensor is influenced by the amount of rubber on the tire and the construction of the steel belts and often can produce inaccurate results. One way to try to avoid such inaccuracies is by re-calibrating the induction sensor each time a tire casing is placed in the buffer. Yet, the recalibration of the induction sensor for each new buffing operation is time-consuming and does not foreclose the possibility of errors in measuring the depth of the steel belts.

BRIEF SUMMARY OF THE INVENTION

The invention provides a tire buffing apparatus for a tire casing having a plurality of steel belts arranged therein. The tire buffing apparatus includes a hub assembly for supporting and rotating a tire casing and a rasp assembly having a rotatable rasp for buffing a tire casing supported on the hub assembly. A belt detection system is provided including an induction coil element that is connectable to an AC power source and a sensor. The induction coil element is configured and arranged in relation to the hub assembly such that when the induction coil element is connected to an AC power source, the induction coil element induces a current in the steel belts of a tire casing supported on the hub assembly. The sensor is arranged and configured to produce a first signal when the rotating rasp is subject to a voltage. A control unit is communication with the sensor and configured to direct the rasp assembly to stop buffing a tire casing supported on the hub assembly when the sensor produces the first signal.

In another aspect, the invention provides a tire buffing apparatus for a tire casing having a plurality of steel belts arranged therein. The tire buffing apparatus includes a hub assembly for supporting and rotating a tire casing and a rasp assembly including a rotatable rasp for buffing a tire casing supported on the hub assembly. A positioning assembly selectively moves the rasp assembly relative to the hub assembly so as to bring the rasp into engagement with a tire casing supported on the hub assembly. A belt detection system is provided that includes an induction coil element that is connectable to an AC power source and a sensor. The induction coil element is configured and arranged in relation to the hub assembly such that when the induction coil element is connected to an AC power source, the induction coil element induces a current in the steel belts of a tire casing supported on the hub assembly. The sensor is arranged and configured to produce a first signal when the rotating rasp is subject to a voltage. A control unit is in communication with the sensor, the rasp assembly and the positioning assembly and configured to direct the rasp assembly to stop rotation of the rasp and the positioning assembly to move the rasp out of engagement with a tire casing supported on the hub assembly when the sensor produces the first signal.

According to a further aspect, the invention provides a method for buffing a tire casing. The method includes the step of supporting a tire casing having a plurality of steel belts arranged therein on a hub assembly. A rotating rasp is brought into engagement with the tire casing on the hub assembly to buff the tire casing. An electric current is induced in the steel belts of the tire casing with an induction coil element. When a voltage is applied to the rasp is sensed.

The rasp is stopped from buffing the tire casing when a voltage is sensed on the rasp.

BRIEF DESCRIPTION OF THE SEVERAL VIEWS OF THE DRAWING(S)

DETAILED DESCRIPTION OF THE INVENTION

Figure 1:
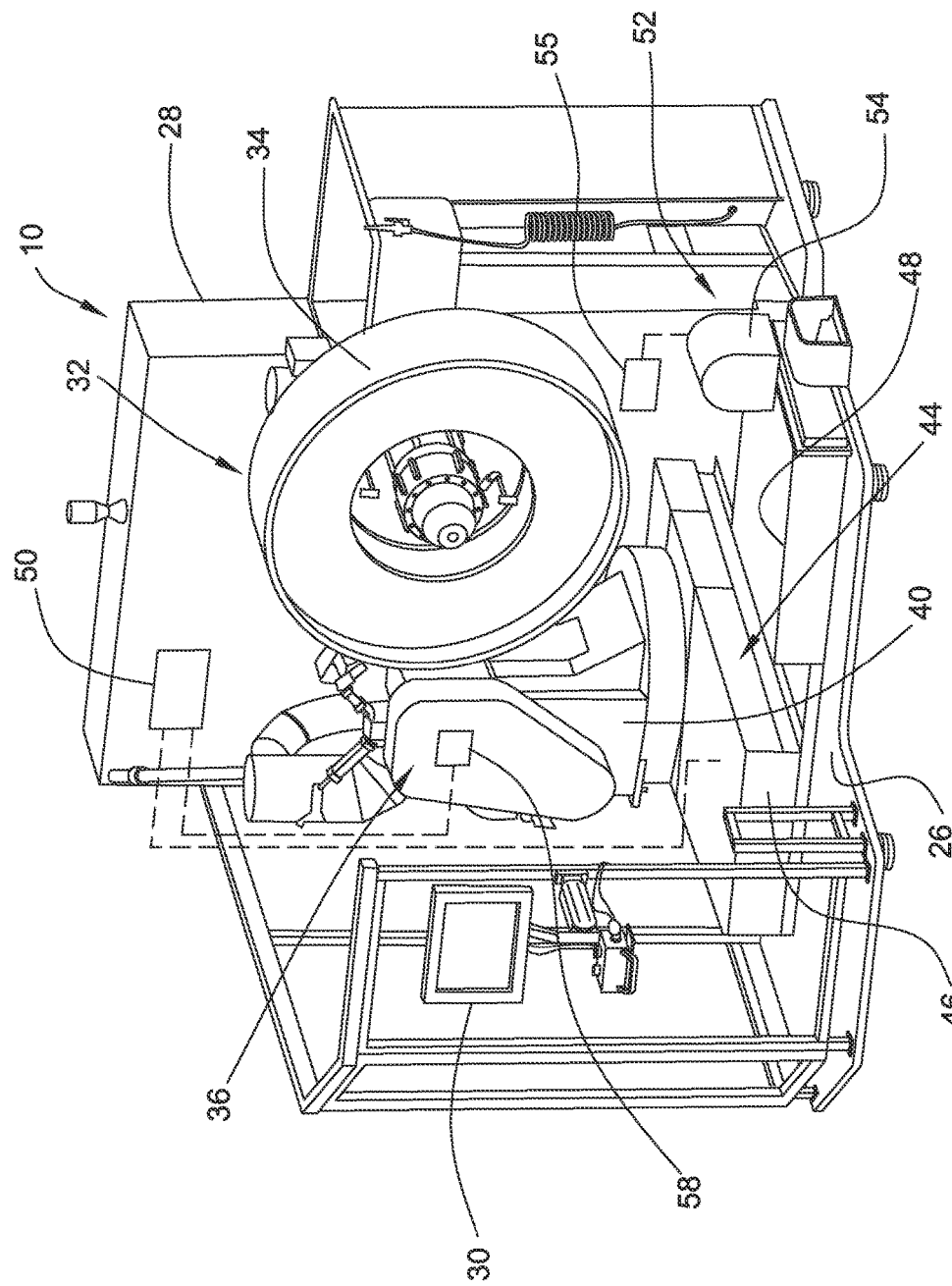
FIG. 1 is a front perspective view of an exemplary tire buffing apparatus in accordance with one embodiment of the present invention.
Figure 2:
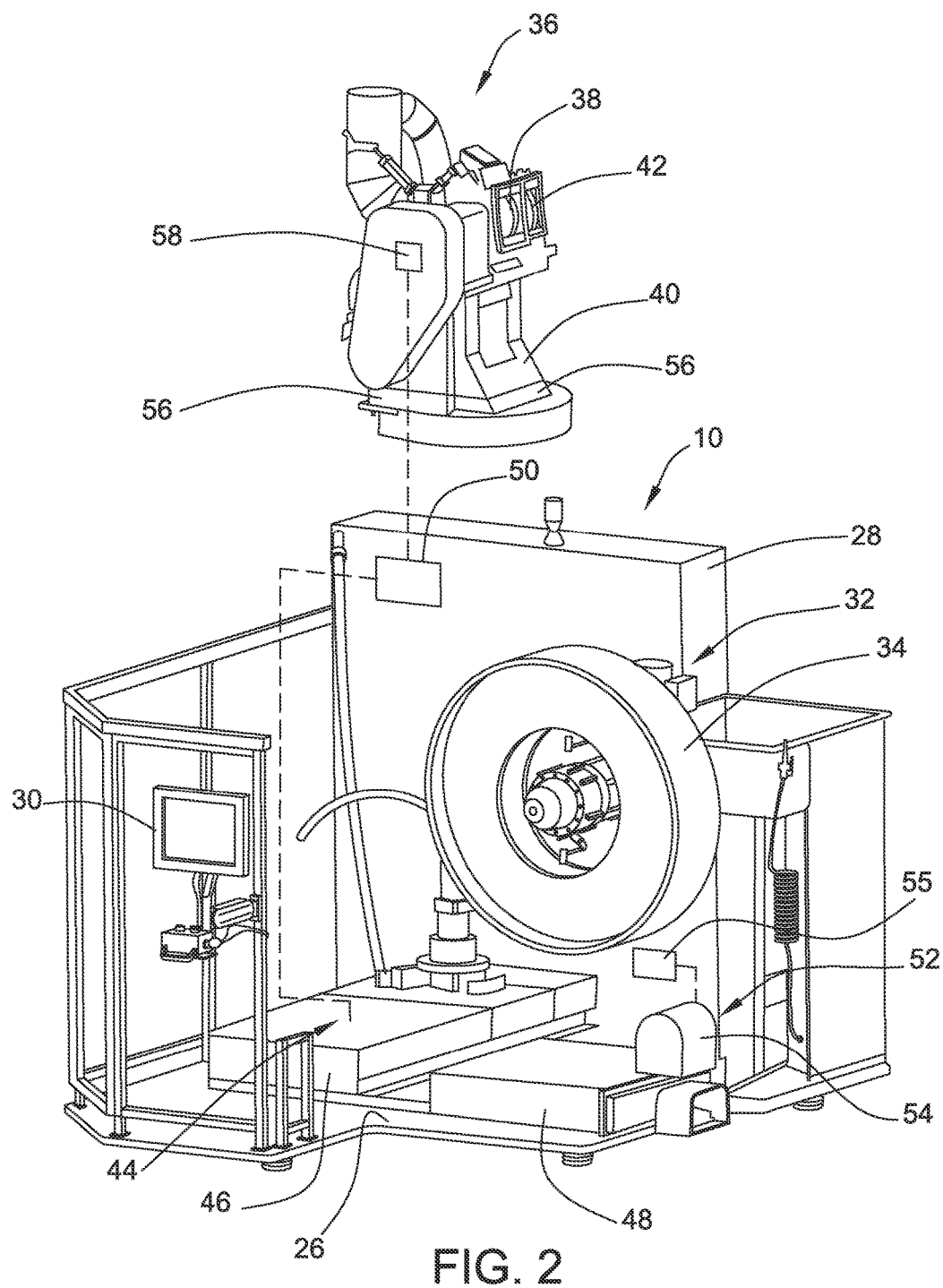
FIG. 2 is a front perspective view of the tire buffing apparatus of FIG. 1 with the rasp pedestal exploded out from the tire buffing apparatus.

Referring to FIGS. 1-2 of the drawings there is shown an illustrative tire buffing apparatus 10 or tire buffer constructed in accordance with the present invention. The illustrated tire buffing apparatus 10 is operable to buff a tire casing and impart a texture thereto.

Figure 3:
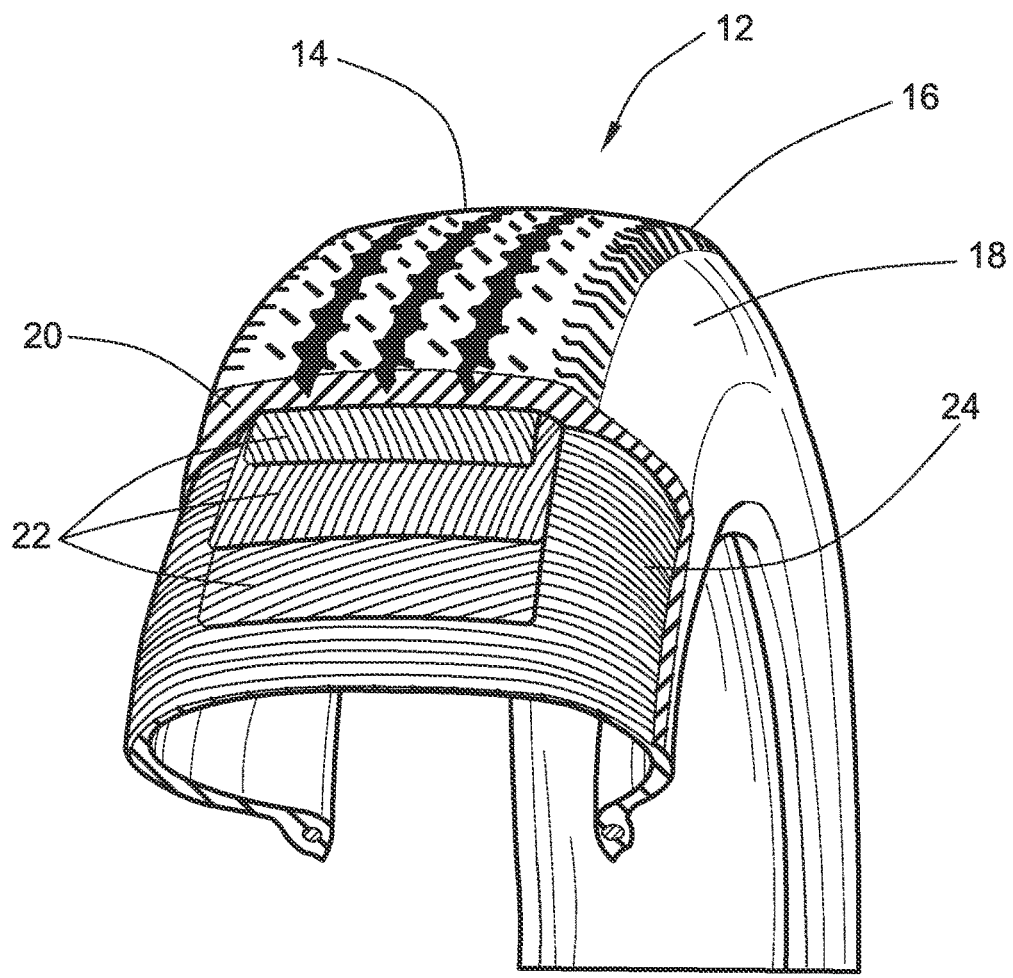
FIG. 3 is a partially cutaway view of an exemplary tire casing for use with the tire buffing apparatus of FIG. 1.

A tire casing 12 generally includes a crown portion 14 bordered on either side by a shoulder portion 16 and a respective sidewall 18. An exemplary tire casing 12 with which the tire buffing apparatus 10 of FIGS. 1 and 2 can be used in shown in FIG. 3. The illustrated tire casing 12 includes an outer tire tread 20, some or all of which may be removed by the tire buffing apparatus 10, and an underlying steel belt package that may include one or more steel belts 22 or cables that are wrapped around the circumference of the tire casing 12. The tire casing 12 illustrated in FIG. 3 has an innermost radial ply layer 24 that is covered by three steel belts 22 arranged one over the other and extending around the circumference of the tire casing underneath the tire tread. Of course, the tire buffing apparatus 10 according to the present invention is not limited to use with a tire casing 12 such as illustrated in FIG. 3. Rather, the present invention can be used with any type of tire casing having a steel belt or cable underlying the outer tread that is wrapped around the tire casing.

In a generally known manner, the tire buffing apparatus 10 is configured to be able to buff, at least, the crown 14 and shoulder portions 16 of the tire casing 12. In the illustrated embodiment, the tire buffing apparatus 10 includes a base 26 that supports the various components of the tire buffing apparatus. The illustrated tire buffing apparatus 10 further includes an electrical enclosure 28 within which electrical components associated with the operation of the buffer can be housed and an operator station 30 that can be used by an operator to direct buffing operations.

For supporting a tire casing 12 to be buffed, the tire buffing apparatus 10 includes a hub assembly 32. The illustrated hub assembly 32 is supported on the base 26 and includes a chuck 34 on which a tire casing is mountable. The chuck 34 is rotatable so that a tire casing supported thereon can be rotated during buffing operations.

For removing material from a tire casing, the buffer 10 includes a rasp assembly 36 having a rotating rasp 38 (shown in FIG. 2). The rasp 38, in this case, is supported on a rasp pedestal 40 in a housing that includes an opening through which a portion of the rasp 38 extends so that it can engage a tire casing. In the illustrated embodiment, the rasp pedestal 40 also supports a texturizing brush 42 (also shown in FIG. 2) that also can be brought into engagement with a tire casing. The rasp pedestal 40 may be supported on the base 12 and configured such that it is rotatable about its vertical axis to allow the rasp 38 to be pivoted relative to a tire casing 12 supported on the hub assembly 32. The rasp 38 is operatively connected to a drive motor supported on the rasp pedestal 40. The rasp 38 may have an associated brake that can be engaged in order to stop rotation of the rasp quickly.

For providing further movement of the pedestal 40, and thereby the rasp 38, relative to the hub assembly 32 and a tire casing 12 supported thereon, the rasp pedestal 40 can be supported on the base 26 by a positioning assembly 44. In this case, the positioning assembly 44 is configured to move the rasp pedestal 40 along perpendicular, horizontal x-y axes relative to the hub assembly 32. To this end, the positioning assembly 44 can include slidable x- and y-tables 46, 48 that are arranged perpendicular to each other on the base 26 and actuators for driving movement of the tables 46, 48 (and thereby the pedestal 40) relative to the base 26. The positioning assembly 44, along with the rotatable configuration of the rasp pedestal 40, enables the rasp 38 to be brought into operative engagement with a tire casing 12 supported on the hub assembly 32 at different angles relative to the casing so that, for example, the rasp 38 can be positioned to buff both the crown 14 and the shoulders 16 of the casing. Additional details regarding the construction and operation of the tire buffing apparatus can be found in U.S. Pat. No. 7,040,371, the disclosure of which is hereby incorporated herein by reference.

For helping control tire buffing operations, a control unit 50 may be provided that is configured to be in communication with one or more operating components of the tire buffing apparatus 10. The control unit 50 can be arranged, for example, in the electrical enclosure as shown schematically in FIGS. 1 and 2. The control unit 50 can be in communication with the positioning assembly 44 so as to control movements of the rasp pedestal 40 relative to a tire casing held on the hub assembly 32. With such an arrangement, the control unit 50 can be used to direct the rasp pedestal 40 along a selected buffing path depending upon the type of tire casing to be buffed, which information a user of the tire buffing apparatus can input to the control unit 50 via the operator station 30. Additionally, the control unit 50 may be configured to communicate with the motors that drive rotation of the rasp 38 and the chuck 34 of the hub assembly 32 so as to be able to selectively operate the rasp and/or the hub assembly. The control unit 50 also may be configured to communicate with the rasp brake in order to direct selective operation of the brake in order to stop rotation of the rasp 38.

To prevent the rotating rasp 38 from damaging the steel belts in a tire casing when it is buffed, the tire buffing apparatus 10 may include a belt detection system 52 configured to sense the location of the steel belts 22 of the tire casing 12 relative to the rasp 38 during a retreading operation. Additionally, the belt detection system 52 may be configured, such as through communication with the control unit 50, to cause the buffing of a tire casing to automatically stop when the rasp 38 gets in relative close proximity to the outermost or top steel belt 22 of a casing being buffed. For example, the belt detection system 52 and control unit 50 may be configured to trigger disengagement of the rasp 38 from the tire casing 12, such as by moving the rasp pedestal 40 away from the casing, when the belt detection system 52 determines that the rasp 38 is in a predetermined position relative to the steel belts 22 of the tire casing. Additionally, or alternatively, the belt detection system 52 and control unit 50 may be configured to stop rotation of the rasp 38 when the belt detection system determines that the rasp is in a predetermined position relative to the steel belts 22 of the tire casing. Accordingly, the belt detection system 52 helps prevent the rasp 38 from cutting into the steel belts 22 of a tire casing being buffed. As noted above, if the any of the steel belts on a tire casing being buffed are damaged in any significant respect, the tire casing may have to undergo time-consuming repairs or be scrapped.

In the illustrated embodiment, the belt detection system 52 includes an induction coil element 54 arranged on the tire buffing apparatus 10 in relative close proximity to the hub assembly 32. In the illustrated embodiment, the induction coil element 54 is arranged in a housing that is supported on the base 26 of the tire buffing apparatus 10 adjacent the electrical enclosure 28 near the hub assembly 32. The induction coil element 54 may include a wound or coiled wire that is selectively connectable to a alternating current (AC) power source 55 (shown schematically in FIGS. 1 and 2), for example through the electrical enclosure 28 of the tire buffing apparatus 10. To this end, the induction coil element 54 may be in communication with the electrical enclosure 28. When connected to the AC power source 55, the induction coil element 54 forms a first coil of an air core transformer. As shown in FIG. 3, the steel belts 22 of the tire casing 12 are wrapped around the tire casing is such a way that the steel belts or cables in the tire casing form the second coil of the air core transformer when the tire casing 12 is arranged on the hub assembly 32. Because of the proximity of the induction coil element 54 to the hub assembly 32, when an alternating electrical current is applied to the induction coil element 54, an oscillating magnetic field is produced that induces an electric current in the steel belts 22 or cables in a tire casing 12 mounted on the hub assembly 32. Thus, when the induction coil element 54 is energized with an alternating current, the steel belts 22 of the tire casing are, in turn, energized with an electric current thereby creating an electric potential between the steel belts 22 and the circuit used to energize the induction coil element 54. While the induction coil element 54 is arranged on the base 26 in the illustrated embodiment, the induction coil element 54 may be arranged in other locations on the tire buffing apparatus 10 so long as the induction coil element 54 is arranged in sufficient proximity to the hub assembly 32 that the induction coil element 54 induces an electric current in the steel belts 22 of the tire casing 12 when the induction coil element is connected to the AC power source 55.

To facilitate detection of when the rasp 38 contacts the steel belts 22 of a tire casing 12, the rasp pedestal 40 may be configured so as to be electrically isolated from the induction coil element 54. According to one embodiment, the rasp pedestal 40 may be electrically isolated by mounting the rasp pedestal 40 on the tire buffing apparatus 10 with one or more rubber or plastic isolators 56 such as shown in FIG. 2. Thus, with this arrangement, if the rotating rasp 38 of the electrically isolated rasp pedestal 40 contacts the steel belts 22 of the tire casing 12, the electric potential or voltage, or a portion thereof, is transferred from the steel belts 22 to the rasp assembly 36. A sensor 58, such as in the form of a sensing circuit, can be arranged so as to provide a signal when the rasp 38 and/or rasp pedestal 40 becomes charged with a voltage. This sensor 58 may be in communication with the control unit 50 that directs operation of the tire buffing apparatus. Upon receiving the signal from the sensor 58 that the electric potential has transferred from the steel belts 22 to the rasp 38, the control unit 50 may be configured to actuate the positioning assembly 44 to move the rasp 38 and rasp pedestal 40 away from the tire casing on the hub assembly 32, activate the rasp brake to stop rotation of the rasp 38, or both. Such an arrangement works regardless of the depth at which the steel belts are arranged in the different tire casings that may be buffed. Accordingly, as compared to determining the depth of steel belts in tire casings using pilot skives or induction sensors, the belt detection system of the present invention is easily set-up for different tire configurations and provides quick and accurate detection of when the rasp comes in contact with the steel belts.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A tire buffing apparatus for a tire casing having a plurality of steel belts arranged therein, the tire buffing apparatus comprising;
   a hub assembly for supporting and rotating a tire casing:
   a rasp assembly including a rotatable rasp for buffing a tire casing supported on the hub assembly;
   a belt detection system including:
      an induction coil element that is connectable to an AC power source, the induction coil element being configured and arranged in relation to the hub assembly such that when the induction coil element is connected to an AC power source, the induction coil element induces a current in the steel belts of a tire casing supported on the hub assembly; and
a sensor arranged and configured to produce a first signal when the rotating rasp is subject to a voltage; and
a control unit in communication with the sensor and configured to direct the rasp assembly to stop buffing a tire casing supported on the hub assembly when the sensor produces the first signal.

2. The tire buffing apparatus according to claim 1 further including a positioning assembly for selectively moving the rasp assembly relative to the hub assembly so as to bring the rasp into engagement with a tire casing supported on the hub assembly.

3. The tire buffing apparatus according to claim 2 wherein the control unit communicates with the positioning assembly and is configured to direct the positioning assembly to move the rasp out of engagement with a tire casing supported on the hub assembly when the sensor produces the first signal.

4. The tire buffing apparatus according to claim 3 wherein the control unit is configured to direct the rasp assembly to stop rotation of the rasp when the sensor produces the first signal.

5. The tire buffing according to claim 1 wherein the control unit is configured to direct the rasp assembly to stop rotation of the rasp when the sensor produces the first signal.

6. The tire buffing apparatus according to claim 1 further including a base for supporting the rasp assembly and the hub assembly and wherein the induction coil element is arranged on the base.

7. The tire buffing apparatus according to claim 1 further including an AC power source.

8. The tire buffing apparatus according to claim 7 further including an electrical enclosure and wherein the control unit is arranged in the electrical enclosure and the induction coil communicates with the electrical enclosure.

9. The tire buffing apparatus according to claim 1 wherein the rasp assembly is configured so as to be electrically isolated from the induction coil.

10. A tire buffing apparatus for a tire casing having a plurality of steel belts arranged therein, the tire buffing apparatus comprising;
a hub assembly for supporting and rotating a tire casing:
a rasp assembly including a rotatable rasp for buffing a tire casing supported on the hub assembly;
a positioning assembly for selectively moving the rasp assembly relative to the hub assembly so as to bring the rasp into engagement with a tire casing supported on the hub assembly;
a belt detection system including:
an induction coil element that is connectable to an AC power source, the induction coil element being configured and arranged in relation to the hub assembly such that when the induction coil element is connected to an AC power source, the induction coil element induces a current in the steel belts of a tire casing supported on the hub assembly; and
a sensor arranged and configured to produce a first signal when the rotating rasp is subject to a voltage; and
a control unit in communication with the sensor, the rasp assembly and the positioning assembly and configured to direct the rasp assembly to stop rotation of the rasp and the positioning assembly to move the rasp out of engagement with a tire casing supported on the hub assembly when the sensor produces the first signal.

11. The tire buffing apparatus according to claim 10 further including a base for supporting the rasp assembly and the hub assembly and wherein the induction coil element is arranged on the base.

12. The tire buffing apparatus according to claim 10 further including an AC power source.

13. The tire buffing apparatus according to claim 10 further including an electrical enclosure and wherein the control unit is arranged in the electrical enclosure and the induction coil communicates with the electrical enclosure.

14. The tire buffing apparatus according to claim 10 wherein the rasp assembly is configured so as to be electrically isolated from the induction coil.

15. A method for buffing a tire casing comprising the steps of:
supporting a tire casing having a plurality of steel belts arranged therein on a hub assembly;
bringing a rotating rasp into engagement with the tire casing on the hub assembly to buff the tire casing;
inducing an electric current in the steel belts of the tire casing with an induction coil element;
sensing when a voltage is applied to the rasp; and
stopping the rasp from buffing the tire casing when a voltage is sensed on the rasp.

16. The method according to claim 15 wherein the step of stopping the rasp from buffing the tire casing is performed by stopping rotation of the rasp.

17. The method according to claim 15 wherein the step of stopping the rasp from buffing the tire casing is performed by moving the rasp out of engagement with the tire casing.

18. The method according to claim 15 wherein the step of stopping the rasp from buffing the tire casing is performed by stopping rotation of the rasp and moving the rasp out of engagement with the tire casing.

19. The method according to claim 15 wherein the step of inducing an electric current in the steel belts of the tire casing with an induction coil element includes connecting the induction coil element to an AC power source.

20. The method according to claim 15 further including the step of rotating the tire casing on the hub assembly.

* * * * *